(12) United States Patent
Xue et al.

(10) Patent No.: US 10,040,433 B1
(45) Date of Patent: Aug. 7, 2018

(54) WHEEL CLEANING DEVICE

(71) Applicant: CITIC Dicastal CO., LTD, Qinhuangdao (CN)

(72) Inventors: Bowen Xue, Qinhuangdao (CN); Huayou Li, Qinhuangdao (CN); Zhanku Wang, Qinhuangdao (CN); Haipeng Feng, Qinhuangdao (CN); Jiandong Guo, Qinhuangdao (CN); Changcun Xiao, Qinhuangdao (CN)

(73) Assignee: Citic Dicastal Co., Ltd (CN)

( * ) Notice: Subject to any disclaimer, the term of this patent is extended or adjusted under 35 U.S.C. 154(b) by 0 days.

(21) Appl. No.: 15/694,110

(22) Filed: Sep. 1, 2017

(30) Foreign Application Priority Data

May 19, 2017 (CN) .......................... 2017 1 0356998

(51) Int. Cl.
*B60S 3/04* (2006.01)
*B60S 3/06* (2006.01)
*A46B 13/02* (2006.01)

(52) U.S. Cl.
CPC .............. *B60S 3/042* (2013.01); *A46B 13/02* (2013.01); *B60S 3/06* (2013.01); *A46B 2200/3046* (2013.01)

(58) Field of Classification Search
CPC ................................... B24B 9/04; B60S 3/042
See application file for complete search history.

(56) References Cited

U.S. PATENT DOCUMENTS

| | | | | |
|---|---|---|---|---|
| 5,600,861 | A * | 2/1997 | Saito | A46B 13/008 |
| | | | | 15/21.1 |
| 6,142,854 | A * | 11/2000 | Remley | B24B 9/04 |
| | | | | 451/242 |
| 2016/0353873 | A1* | 12/2016 | Xue | A46B 13/02 |
| 2016/0354891 | A1* | 12/2016 | Xue | B24B 5/44 |

* cited by examiner

*Primary Examiner* — Randall Chin
(74) *Attorney, Agent, or Firm* — Calfee, Halter & Griswold LLP

(57) ABSTRACT

The application discloses an improved wheel cleaning device, comprising a lifting system, a brush system, a clamping rotating system, a turnover system and an ejection system. When the device is used, a cylinder II drives a left sliding plate to synchronously clamp a wheel, and a servo motor II drives the wheel to rotate; a servo motor I drives a horizontal brush to rotate, cylinders I drive the rotating horizontal brush and vertical brush to ascend, and when the horizontal brush contacts a wheel flange, base powder which is redundant during spraying therein can be removed; an electric servo cylinder drives the vertical brush to move right, and when the vertical brush contacts a center hole of the wheel, base powder which is redundant during spraying sprayed therein can be removed; after the base powder is removed, a servo motor III drives the clamped wheel to turn over 180 degrees.

1 Claim, 2 Drawing Sheets

WHEEL CLEANING DEVICE

CROSS-REFERENCE TO RELATED APPLICATIONS

This application claims priority to Chinese Patent Application No. 2017103569982, filed on May 19, 2017, which is hereby incorporated by reference in its entirety.

TECHNICAL FIELD

The present application relates to a cleaning device, and specifically, to a sprayed base powder cleaning device.

BACKGROUND ART

In the production process of an aluminum alloy wheel, the spraying procedure is very important, and the process is to make the wheel have a better appearance effect. However, this process has numerous steps, wherein after base powder and colored paint are sprayed to the wheel for the first time and before next step is performed, the base powder on a flange and a center hole of the wheel must be removed; if the base powder is removed manually at the moment, the efficiency will be very low, and the effect is not very good; thus, an automatic device for quickly removing the base powder on line is needed.

SUMMARY OF THE INVENTION

The present application is aimed at providing an improved wheel cleaning device, which not only may be used for removing base powder left on a flange and a center hole after a wheel is sprayed, but also may effectively solve the problem of adhesion between protective plugs and the wheel after the wheel is sprayed.

To fulfill the above aim, the present application adopts the following technical solution: an improved wheel cleaning device comprises a frame, cylinders I, lower guide posts, lower guide sleeves, a bottom plate, a lifting plate, a gear I, a bearing seat I, a belt pulley I, a spline sleeve, a spline shaft, a lower support, a movable plate, a synchronous belt I, an upper support, a servo motor I, a belt pulley II, a belt pulley III, a synchronous belt II, a bearing seat II, a shaft II, a vertical brush, a belt pulley IV, a shaft III, a horizontal brush, a left bearing seat I, a left shaft I, a turntable plate, a guide rail I, a left sliding plate, left bearing seats II, left shafts II, a cylinder II, racks, V-shaped rollers, a gear II, ejector rods, springs, a pressure plate, upper guide posts, upper guide sleeves, cylinders III, right shafts II, right bearing seats II, a right sliding plate, a servo motor II, a right shaft I, a right bearing seat I, a servo motor III, a gear III, an electric servo cylinder, a guide rail II, fixed racks, supporting rollers and the like.

A lifting system comprises: the bottom plate is fixed below the frame; the four lower guide sleeves are fixed on the bottom plate, and the four lower guide posts matched with the lower guide sleeves are fixed below the lifting plate; the two cylinders I are also fixed on the bottom plate, and the output ends of the cylinders I are articulated with the lower part of the lifting plate.

A brush system comprises: the two fixed racks are fixed at the left end of the lower part of the movable plate, and the two supporting rollers are mounted below the fixed racks and contact the top of the lifting plate; the right end of the movable plate is mounted above the lifting plate via the guide rail II; the electric servo cylinder is fixed on the movable plate, and the output end of the electric servo cylinder is connected with the upper part of the lifting plate; the upper support is fixed on the movable plate; the servo motor I is fixed below the upper support, and the belt pulley II and the belt pulley III are fixed at the output end of the servo motor I; the shaft III is mounted in a bearing seat above the upper support; the belt pulley IV is mounted on the shaft III, and the horizontal brush is fixed on the right of the belt pulley IV; the belt pulley II is connected with the belt pulley IV via the synchronous belt II; the lower support is fixed below the movable plate; the bearing seat I is fixed on the left of the lower support; the spline sleeve is mounted in the bearing seat I via a bearing, and the belt pulley I is fixed at the right end of the spline sleeve; the gear I is fixed at the right end of the spline shaft, and the spline shaft is matched with the spline sleeve; the belt pulley I is connected with the belt pulley III via the synchronous belt I; the bearing seat II is fixed on the movable plate, and the shaft II is mounted inside the bearing seat II via a bearing; the gear III is fixed at the lower end of the shaft II, and the vertical brush is fixed at the upper end of the shaft II; and the gear I is engaged with the gear III.

A clamping rotating system comprises: the left sliding plate is mounted above the turntable plate via the guide rail I; the two left bearing seats II are fixed on the left sliding plate, and the two left shafts II are mounted in the left bearing seats II via bearings; a V-shaped roller is respectively mounted at the upper parts of the two left shafts II; the right sliding plate is mounted above the turntable plate via the guide rail I; the two right bearing seats II are fixed on the right sliding plate, and the two right shafts II are mounted inside the right bearing seats II via bearings; a V-shaped roller is respectively mounted at the upper parts of the right shafts II; the servo motor II is mounted below the right sliding plate, and the output end of the servo motor II is connected with one right shaft II; the gear II is mounted above the turntable plate, a rack is respectively fixed below the left sliding plate and the right sliding plate, and the racks are engaged with the gear II; the cylinder II is fixed above the turntable plate, and the output end of the cylinder II is connected with the left sliding plate.

A turnover system comprises: the left bearing seat I is fixed on the left of the frame, the left shaft I is mounted inside the left bearing seat I via a bearing, and the right end of the left shaft I is connected with the left side of the turnover plate; the right bearing seat I is fixed on the right of the frame, and the right shaft I is mounted inside the right bearing seat I via a bearing; the left end of the right shaft I is connected with the right end of the turnover plate; and the servo motor III is fixed on the right of the right bearing seat I and connected with the right shaft I.

An ejection system comprises: the four upper guide sleeves and the two cylinders III are all fixed at the top of the frame; the four upper guide posts are fixed on the pressure plate, and matched with the upper guide sleeves; the output ends of the cylinders III are articulated with the upper part of the pressure plate; the upper ends of the ejector rods are matched with holes in the pressure plate; and the springs are mounted outside the ejector rods and arranged below the pressure plate.

In practical use, the cylinder II drives the left sliding plate so that the four V-shaped rollers synchronously clamp a wheel via the gear II and the racks, and the servo motor II drives the clamped wheel to rotate; the servo motor I drives the horizontal brush to rotate via the synchronous belt II and simultaneously drives the spline sleeve and the spline shaft to rotate via the synchronous belt I, and the gear I is engaged with the gear III to drive the vertical brush to rotate simultaneously; the cylinders I drive the rotating horizontal brush and the rotating vertical brush to ascend via the lower guide posts, and when the horizontal brush contacts a wheel flange, base powder which is redundant during spraying therein can be removed; the electric servo cylinder drives the vertical brush to move right via the guide rail II, and when the vertical brush contacts a center hole of the wheel, base powder which is redundant during spraying therein can be removed; after the base powder is removed, the servo motor III drives the clamped wheel to turn over 180 degrees via the right shaft I, the cylinders III drive the plurality of ejector rods to move down via the upper guide posts, the plurality of ejector rods jacking the wheel flange can retract, and when the ejector rods jack protective plugs in bolt holes of the wheel, the protective plugs can be ejected under the action of the springs.

The improved wheel cleaning device of the present invention not only may be used for removing base powder left on the flange and the center hole after the wheel is sprayed, but also may effectively solve the problem of adhesion between the protective plugs and the wheel after the wheel is sprayed, and simultaneously has the characteristics of high production efficiency, high automation degree, advanced process, strong generality and high safety and stability.

Figure 1:
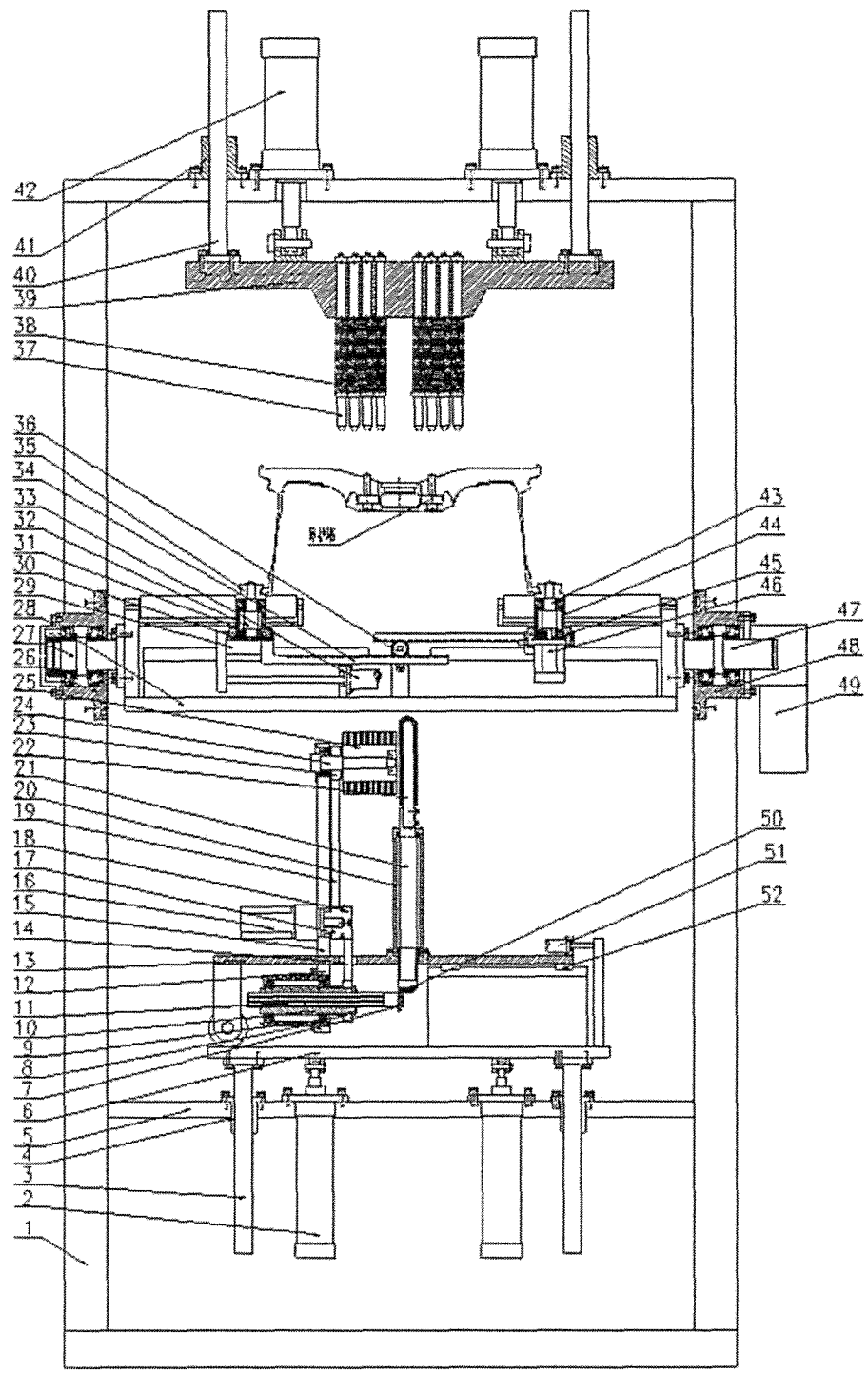
FIG. 1 is a front view of an improved wheel cleaning device of the present application.
Figure 2:
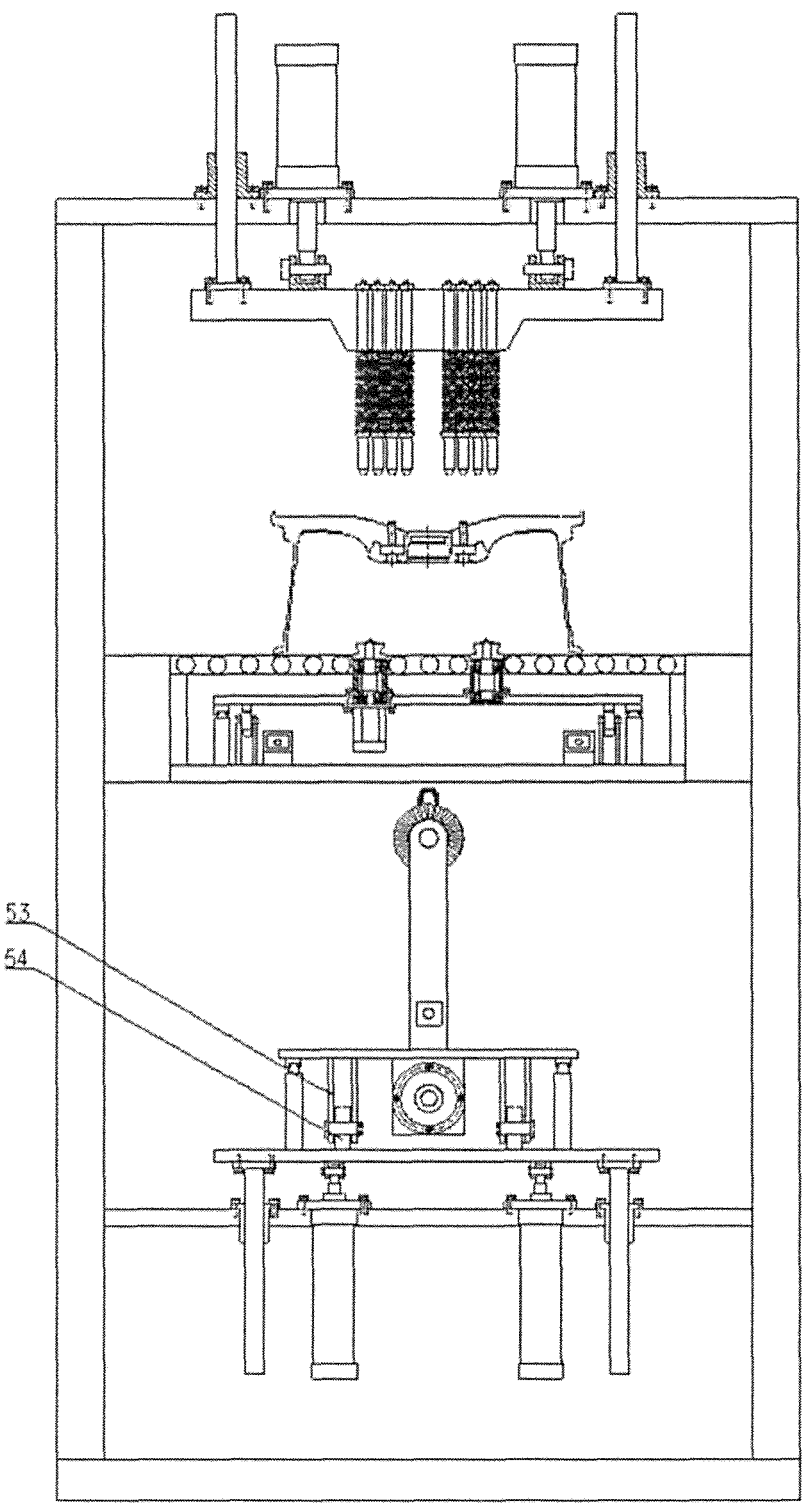
FIG. 2 is a left view of the improved wheel cleaning device of the present application.

In which: 1—frame, 2—cylinder I, 3—lower guide post, 4—lower guide sleeve, 5—bottom plate, 6—lifting plate, 7—gear I, 8—bearing seat I, 9—belt pulley I, 10—spline sleeve, 11—spline shaft, 12—lower support, 13—movable plate, 14—synchronous belt I, 15—upper support, 16—servo motor I, 17—belt pulley II, 18—belt pulley III, 19—synchronous belt 20—bearing seat II, 21—shaft II, 22—vertical brush, 23—belt pulley IV, 24—shaft III, 25—horizontal brush, 26—left bearing seat I, 27—left shaft I, 28—turntable plate, 29—guide rail I, 30—left sliding plate, 31—left bearing seat II, 32—left shaft II, 33—cylinder II, 34—rack, 35—V—shaped roller, 36—gear II, 37—ejector rod, 38—spring, 39—pressure plate, 40—upper guide post, 41—upper guide sleeve, 42—cylinder III, 43—right shaft II, 44—right bearing seat II, 45—right sliding plate, 46—servo motor II, 47—right shaft I, 48—right bearing seat I, 49—servo motor III, 50—gear III, 51—electric servo cylinder, 52—guide rail II, 53—fixed rack, 54—supporting roller.

DETAILED DESCRIPTION OF THE INVENTION

The details and working conditions of the specific device provided by the present application will be described in combination with the accompanying drawings.

The device comprises a frame 1, cylinders I 2, lower guide posts 3, lower guide sleeves 4, a bottom plate 5, a lifting plate 6, a gear I 7, a bearing seat I 8, a belt pulley I 9, a spline sleeve 10, a spline shaft 11, a lower support 12, a movable plate 13, a synchronous belt I 14, an upper support 15, a servo motor I 16, a belt pulley II 17, a belt pulley III 18, a synchronous belt II 19, a bearing seat II 20, a shaft II 21, a vertical brush 22, a belt pulley IV 23, a shaft III 24, a horizontal brush 25, a left bearing seat I 26, a left shaft I 27, a turntable plate 28, a guide rail I 29, a left sliding plate 30, left bearing seats II 31, left shafts II 32, a cylinder II 33, racks 34, V-shaped rollers 35, a gear II 36, ejector rods 37, springs 38, a pressure plate 39, upper guide posts 40, upper guide sleeves 41, cylinders III 42, right shafts II 43, right bearing seats II 44, a right sliding plate 45, a servo motor II 46, a right shaft I 47, a right bearing seat I 48, a servo motor III 49, a gear III 50, an electric servo cylinder 51, a guide rail II 52, fixed racks 53 and supporting rollers 54.

A lifting system comprises: the bottom plate 5 is fixed below the frame 1; the four lower guide sleeves 4 are fixed on the bottom plate 5; the four lower guide posts 3 are matched with the lower guide sleeves 4, and are fixed below the lifting plate 6; the two cylinders I 2 are also fixed on the bottom plate 5, and the output ends of the cylinders I 2 are articulated with the lower part of the lifting plate 6.

A brush system includes: the two fixed racks 53 are fixed at the left end of the lower part of the movable plate 13, and the two supporting rollers 54 are mounted below the fixed racks 53 and contact the top of the lifting plate 6; the right end of the movable plate 13 is mounted above the lifting plate 6 via the guide rail II 52; the electric servo cylinder 51 is fixed on the movable plate 13, and the output end of the electric servo cylinder 51 is connected with the upper part of the lifting plate 6; the upper support 15 is fixed on the movable plate 13; the servo motor I 16 is fixed below the upper support 15, and the belt pulley II 17 and the belt pulley III 18 are fixed at the output end of the servo motor I 16; the shaft III 24 is mounted in a bearing seat above the upper support 15; the belt pulley IV 23 is mounted on the shaft III 24, and the horizontal brush 25 is fixed on the right of the belt pulley IV 23; the belt pulley II 17 is connected with the belt pulley IV 23 via the synchronous belt II 19; the lower support 12 is fixed below the movable plate 13; the bearing seat I 8 is fixed on the left of the lower support 12; the spline sleeve 10 is mounted in the bearing seat I 8 via a bearing, and the belt pulley I 9 is fixed at the right end of the spline sleeve 10; the gear I 7 is fixed at the right end of the spline shaft 11, and the spline shaft 11 is matched with the spline sleeve 10; the belt pulley I 9 is connected with the belt pulley III 18 via the synchronous belt I 14; the bearing seat II 20 is fixed on the movable plate 13, and the shaft II 21 is mounted inside the bearing seat II 20 via a bearing; the gear III 50 is fixed at the lower end of the shaft II 21, and the vertical brush 22 is fixed at the upper end of the shaft II 21; and the gear I 7 is engaged with the gear III 50.

A clamping rotating system comprises: the left sliding plate 30 is mounted above the turntable plate 28 via the guide rail I 29; the two left bearing seats II 31 are fixed on the left sliding plate 30, and the two left shafts II 32 are mounted in the left bearing seats II 31 via bearings; a V-shaped roller 35 is respectively mounted at the upper parts of the two left shafts II 32; the right sliding plate 45 is mounted above the turntable plate 28 via the guide rail I 29; the two right bearing seats II 44 are fixed on the right sliding plate 45, and the two right shafts II 43 are mounted inside the right bearing seats II 44 via bearings; a V-shaped roller 35 is respectively mounted at the upper parts of the right shafts II 43; the servo motor II 46 is mounted below the right sliding plate 45, and the output end of the servo motor II 46 is connected with one right shaft II 43; the gear II 36 is mounted above the turntable plate 28, a rack 34 is respectively fixed below the left sliding plate 30 and the right sliding plate 45, and the racks 34 are engaged with the gear II 36; the cylinder II 33 is fixed above the turntable plate 28, and the output end of the cylinder II 33 is connected with the left sliding plate 30.

A turnover system comprises: the left bearing seat I 26 is fixed on the left of the frame 1, the left shaft I 27 is mounted inside the left bearing seat I 26 via a bearing, and the right end of the left shaft I 27 is connected with the left side of the turnover plate 28; the right bearing seat I 48 is fixed on the right of the frame 1, and the right shaft I 47 is mounted inside the right bearing seat I 48 via a bearing; the left end of the right shaft I 47 is connected with the right end of the turnover plate 28; and the servo motor III 49 is fixed on the right of the right bearing seat I 48 and connected with the right shaft I 47.

An ejection system comprises: the four upper guide sleeves 41 and the two cylinders III 42 are all fixed at the top of the frame 1; the four upper guide posts 40 are fixed on the pressure plate 39, and matched with the upper guide sleeves 41; the output ends of the cylinders III 42 are articulated with the upper part of the pressure plate 39; the upper ends of the ejector rods 37 are matched with holes in the pressure plate 39; and the springs 38 are mounted outside the ejector rods 37 and arranged below the pressure plate 39.

In the working process, the cylinder II 33 drives the left sliding plate 30 so that the four V-shaped rollers 35 synchronously clamp a wheel via the gear II 36 and the racks 34, and the servo motor II 46 drives the clamped wheel to rotate; the servo motor I 16 drives the horizontal brush 25 to rotate via the synchronous belt II 19 and simultaneously drives the spline sleeve 10 and the spline shaft 11 to rotate via the synchronous belt I 14, and the gear I 7 is engaged with the gear III 50 to drive the vertical brush 22 to rotate simultaneously; the cylinders I 2 drive the rotating horizontal brush 25 and vertical brush 22 to ascend via the lower guide posts 3, and when the horizontal brush 25 contacts a wheel flange, base powder which is redundant during spraying therein can be removed; the electric servo cylinder 51 drives the vertical brush 22 to move right via the guide rail II 52, and when the vertical brush 22 contacts a center hole of the wheel, base powder which is redundant during spraying therein can be removed; after the base powder is removed, the servo motor III 49 drives the clamped wheel to turn over 180 degrees via the right shaft I 47, the cylinders III 42 drive the plurality of ejector rods 37 to move down via the upper guide posts 40, the plurality of ejector rods 37 jacking the wheel flange can retract, and when the ejector rods 37 jack protective plugs in bolt holes of the wheel, the protective plugs can be ejected under the action of the springs 38.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An improved wheel cleaning device, comprising a frame, two cylinders I, four lower guide posts, four lower guide sleeves, a bottom plate, a lifting plate, a gear I, a bearing seat I, a belt pulley I, a spline sleeve, a spline shaft, a lower support, a movable plate, a synchronous belt I, an upper support, a servo motor I, a belt pulley II, a belt pulley III, a synchronous belt II, a bearing seat II, a shaft II, a vertical brush, a belt pulley IV, a shaft III, a horizontal brush, a left bearing seat I, a left shaft I, a turntable plate, a guide rail I, a left sliding plate, two left bearing seats II, two left shafts II, a cylinder II, racks, four V-shaped rollers, a gear II, ejector rods, springs, a pressure plate, four upper guide posts, upper guide sleeves, two cylinders III, two right shafts II, two right bearing seats II, a right sliding plate, a servo motor II, a right shaft I, a right bearing seat I, a servo motor III, a gear III, an electric servo cylinder, a guide rail II, two fixed racks and two supporting rollers, wherein a lifting system comprises: the bottom plate is fixed below the frame; the four lower guide sleeves are fixed on the bottom plate; the four lower guide posts are matched with the lower guide sleeves, and are fixed below the lifting plate; the two cylinders I are also fixed on the bottom plate, and output ends of the cylinders I are articulated with a lower part of the lifting plate;

a brush system comprises: the two fixed racks are fixed at the left end of a lower part of the movable plate, and the two supporting rollers are mounted below the fixed racks and contact the top of the lifting plate; the right end of the movable plate is mounted above the lifting plate via the guide rail II; the electric servo cylinder is fixed on the movable plate, and an output end of the electric servo cylinder is connected with an upper part of the lifting plate; the upper support is fixed on the movable plate; the servo motor I is fixed below the upper support, and the belt pulley II and the belt pulley III are fixed at an output end of the servo motor I; the shaft III is mounted in a bearing seat above the upper support; the belt pulley IV is mounted on the shaft III, and the horizontal brush is fixed on the right of the belt pulley IV; the belt pulley II is connected with the belt pulley IV via the synchronous belt II; the lower support is fixed below the movable plate; the bearing seat I is fixed on the left of the lower support; the spline sleeve is mounted in the bearing seat I via a bearing, and the belt pulley I is fixed at the right end of the spline sleeve; the gear I is fixed at the right end of the spline shaft, and the spline shaft is matched with the spline sleeve; the belt pulley I is connected with the belt pulley III via the synchronous belt I; the bearing seat II is fixed on the movable plate, and the shaft II is mounted inside the bearing seat II via a bearing; the gear III is fixed at a lower end of the shaft II, and the vertical brush is fixed at an upper end of the shaft II; the gear I is engaged with the gear III;

a clamping rotating system comprises: the left sliding plate is mounted above the turntable plate via the guide rail I; the two left bearing seats II are fixed on the left sliding plate, and the two left shafts II are mounted in the left bearing seats II via bearings; a V-shaped roller is respectively mounted at upper parts of the two left shafts II; the right sliding plate is mounted above the turntable plate via the guide rail I; the two right bearing seats II are fixed on the right sliding plate, and the two right shafts II are mounted inside the right bearing seats II via bearings; a V-shaped roller is respectively mounted at upper parts of the right shafts II; the servo motor II is mounted below the right sliding plate, and an output end of the servo motor II is connected with one right shaft II; the gear II is mounted above the turntable plate, a rack is respectively fixed below the left sliding plate and the right sliding plate, and the racks are engaged with the gear II; the cylinder II is fixed above the turntable plate, and an output end of the cylinder II is connected with the left sliding plate;

a turnover system comprises: the left bearing seat I is fixed on the left of the frame, the left shaft I is mounted inside the left bearing seat I via a bearing, and the right end of the left shaft I is connected with the left side of the turnover plate; the right bearing seat I is fixed on the right of the frame, and the right shaft I is mounted inside the right bearing seat I via a bearing; the left end of the right shaft I is connected with the right end of the turnover plate; the servo motor III is fixed on the right of the right bearing seat I and connected with the right shaft I;

an ejection system comprises: the four upper guide sleeves and the two cylinders III are all fixed at the top of the frame; the four upper guide posts are fixed on the pressure plate, and matched with the upper guide sleeves; output ends of the cylinders III are articulated with an upper part of the pressure plate; the upper ends of the ejector rods are matched with holes in the pressure plate; and the springs are mounted outside the ejector rods and arranged below the pressure plate.

* * * * *